United States Patent [19]
Heinrich

[11] 3,790,264
[45] Feb. 5, 1974

[54] MOVIE CAMERA RELEASE CONTROL CIRCUIT WITH VOLTAGE STABILIZATION

[75] Inventor: Frank-Armin Heinrich, Korb, Germany

[73] Assignee: Robert Bosch Photokino GmbH, Stuttgart, Germany

[22] Filed: June 8, 1972

[21] Appl. No.: 261,039

[30] Foreign Application Priority Data
July 7, 1971 Germany.......................... 2133704

[52] U.S. Cl. .............................................. 352/174
[51] Int. Cl. ............................................. G03b 1/00
[58] Field of Search ........ 317/DIG. 6; 352/174, 178

[56] References Cited
UNITED STATES PATENTS

| | | | |
|---|---|---|---|
| 3,411,045 | 11/1968 | Reyner............................ | 317/DIG. 6 |
| 3,205,412 | 9/1965 | Winston.......................... | 317/DIG. 6 |
| 3,165,688 | 1/1965 | Gutzwiller...................... | 317/DIG. 6 |
| 3,139,562 | 6/1964 | Freeborn ........................ | 316/DIG. 6 |

Primary Examiner—Samuel S. Matthews
Assistant Examiner—Michael L. Gellner
Attorney, Agent, or Firm—Michael S. Striker

[57] ABSTRACT

Activation of the camera release button causes a first transistor to become fully conductive, furnishing a high energizing current to the release magnet. A timing circuit connected to the transistor causes cut-off of the transistor after a predetermined time interval. A second transistor furnishing a decreased holding current then becomes activated. A Zener diode serves to stabilize the voltage for both transistors, causing the circuit to be independent of battery voltage variations.

7 Claims, 1 Drawing Figure

PATENTED FEB 5 1974
3,790,264
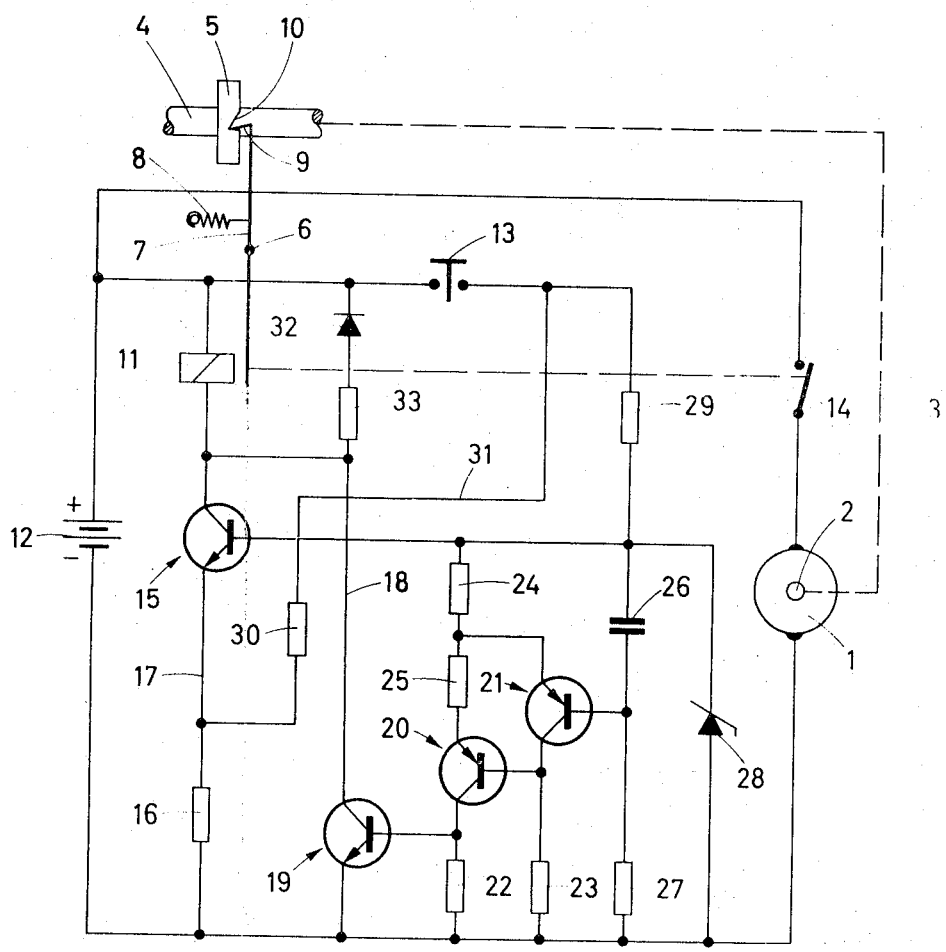

MOVIE CAMERA RELEASE CONTROL CIRCUIT WITH VOLTAGE STABILIZATION

BACKGROUND OF THE INVENTION

This invention relates to activating arrangements for movie cameras and in particular for movie cameras wherein a D.C. magnet powered by a battery activates the camera upon operation of a release key. Even more specifically, it relates to such a camera wherein the magnet is first energized with a predetermined maximum energizing current to effect the pull-in operation and then energized at a lesser current during the hold phase.

A variety of such arrangements are already known. The particular advantage of such arrangement results from the fact that a decrease in current during the hold phase decreases the power loss as well as decreasing the time delay during the pull-in and the drop-out phase. Further, the magnetic coil can be smaller when such an arrangement is used.

In known arrangements of this type, the magnitude of current during the hold phase is determined by a series resistance and therefore varies as a function of variations in the battery output voltage. If a new battery is used which still operates at its nominal voltage, the magnet receives an unnecessarily large hold current, while a battery whose output voltage has decreased considerably due to aging, barely manages to maintain the required hold current. Thus, for very high battery voltages, the excess current drawn from the battery decreases the life of the battery and further results in an increase of the drop-out time of the electromagnet. The increase in the drop-out time, particularly when individual frames are being photographed, results in incorrect exposure of the film.

SUMMARY OF THE INVENTION

It is an object of the present invention to furnish a movie camera of the above-described type which does not have the above-described disadvantages, that is in particular to furnish an arrangement wherein the drop-out time is independent of the battery output voltage.

The present invention comprises a movie camera having externally operable release means and a magnet activating said camera in response to operation of said release means, said magnet having a pull-in and a hold phase, respectively requiring maximum and decreased energizing current. The invention further comprises battery means having battery output voltage and control circuit means connected to said battery means for furnishing said maximum energizing current to said magnet means upon operation of said release means and for furnishing said decreased energizing current to said magnet means a predetermined time interval following operation of said release means. Finally, voltage stabilizing means are connected to said control circuit means whereby said control circuit means operates substantially independently of variations in said battery output voltage. The decreased energizing current or hold current thereby remains substantially independent of the battery output voltage.

In a particularly preferred embodiment of the present invention, the control circuit furnishing the hold current comprises a first resistor connected in series with the emitter-collector circuit of a first transistor whose base is connected to the stabilizing circuit means.

Additional stabilization may be achieved for the hold current by connecting compensating resistor means in parallel with the coil of the magnet and the emitter-collector circuit of the first transistor means.

In a further preferred embodiment of the present invention, the emitter-collector circuit of a second transistor is connected in parallel with the series combination of said first resistor and the emitter-collector circuit of said first transistor. The base of said second transistor is connected to a timing circuit which furnishes the predetermined time interval after which the energizing current through the magnet means is reduced.

In a further preferred embodiment of the present invention said timing circuit means comprise an RC timing circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING:

The single FIGURE is a circuit diagram of a preferred embodiment of the present invention.

DESCRIPTION OF THE PREFERRED EMBODIMENTS:

A preferred embodiment of the present invention will now be described with reference to the drawing.

Reference numeral 1 in the FIGURE shows an electric D.C. motor which serves as the drive for a movie camera. The motor has a shaft 2 which drives a shaft 4 mounted within the camera through gearing schematically indicated by a dashed line. A rotary shutter (not shown) is mounted on the shaft, which shaft further controls the film transport in conventional fashion. A stop wheel 5 is mounted on shaft 4. The stop wheel cooperates with a two-armed release lever 7 which is pivotably mounted on an axis 6. Axis 6 is connected to the body of the camera. Release lever 7 has a lip 9 which, under the force of a spring 8, engages in the recess 10 of wheel 5, thereby stopping shaft 4 in an exactly defined angular position in which the shutter prevents scene light from reaching the film. When the operation of the camera is initiated, the release lever 7 is pivoted under the force of the magnetic field induced by current flow through the coil of magnet 11, which force opposes the action of spring 8. The lip 9 is disengaged from the stop wheel 5 and allows shaft 4 to rotate.

Motor 1 and D.C. magnet 11 are energized by battery 12. Current flows through the coil of magnet 11 upon closure of an externally operable release means 13, namely a switch, while the motor is energized upon closing of a switch 14 which is mechanically coupled to lever 7.

As mentioned above, it is desirable to decrease the current through coil 11 after the pull-in operation has been completed, thereby saving energy and creating short drop-out times and requiring a smaller coil dimension. The time at which the circuit switches to a decreased energizing current can be determined by a timing circuit. In the present invention, the circuit supplying the hold or decreased energizing current comprises a transistor 15 which has an emitter-collector circuit connected in series with the coil of magnet 11 and a first resistor 16, connected in series with the emitter-collector circuit of transistor 15. Resistor 16 of course serves to limit the current through the coil of magnet 11. A line 17 connects the emitter of transistor 15 to resistor 16. The maximum energizing current or pull-in current is conducted through the emitter-collector circuit of a transistor 19, herein referred to as second transistor means, whose emitter is connected to the negative side of the battery, while its collector is connected to the collector of transistor 15 through a conductor 18. The base of transistor 19 is connected to the timing circuit means, here a capacitor 26 connected in series with a resistor 27, through a two transistor switching stage comprising transistors 20 and 21 as well as resistors 22–25.

The voltage stabilizing means which keep the hold current through magnet 11 substantially independent of battery voltage comprise a Zener diode 28 connected in series with a resistor 29. The Zener diode 28 is operated in the reverse direction. The base of transistor 15 is connected to the common point of Zener diode 28 and resistor 29, to which common point is also connected terminal of the timing circuit (capacitor 26). The value of resistor 29 is so chosen that the current flowing through the Zener diode is of a magnitude which lies in approximately the middle of its characteristic curve. A further resistor 30, herein referred to as compensating resistor means has one terminal connected to conductor 17 and a second terminal connected to the second terminal of resistor 29 through a line 31. It is the function of resistor 30 to compensate for even the minor variations of Zener diode voltage as a function of varying battery voltage. Thus the hold current assumes an even more constant value independent of battery output voltage variation.

The above-described arrangement operates as follows:

While release key 13 is open, transistors 15 and 19 are blocked, thereby rendering the coil of magnet 11 free of current. Release lever 7 is thus in its blocking position due to the force exerted by spring 8. In this position the motor switch 14 is open.

If switch 13 is now closed, current flows through Zener diode 28 via resistor 29. The voltage across Zener diode 28 thus is a stabilized internally supply voltage. If the voltage of battery 12 increases for any reason, the current through the Zener diode increases, even for relatively small battery voltage variations, to a substantially greater value. This causes the voltage drop across resistor 29 to increase, thereby causing the voltage at the base of transistor 15 to remain substantially constant. Equally, if the input voltage decreases, the current through the Zener diode decreases, decreasing the voltage drop across resistor 29 and again keeping the voltage at the base of transistor 15 substantially constant.

Closing of switch 13 also causes capacitor 26 to charge through resistor 27. During the charging process transistor 21 is blocked, since the voltage drop across resistor 24 is at that time less than the voltage drop across capacitor 26.

Transistor 20 has base current flow substantially immediately after the closing of switch 13 and is therefore conductive. The flow of collector current through resistor 22 in turn causes transistor 19 to become highly conductive, thereby short circuiting the emitter-collector circuit of transistor 15 and resistor 16. Thus the full battery voltage is applied to the coil of magnet 11 through the emitter-collector circuit of transistor 19. A strong magnetic field is thus induced in magnet 11 which causes lever 7 to pivot, closing switch 14. Thus motor 1 is activated and shaft 4 rotates.

When the voltage across capacitor 26 has reached a determined threshold value, the state of transistor 21 changes from a blocked state to a conductive state, thereby blocking the hitherto conductive transistors 19 and 20. The current through coil 11 is now only the hold current, namely the current limited by resistor 16 and flowing through the collector-emitter circuit of transistor 15 whose base is connected with Zener diode 28. The latter, in conjunction with resistor 30 causes the hold current to assume a constant value independent of the output voltage of battery 12.

Upon release of switch or button 13, Zener diode 28, timing circuit 26 and 27 as well as the control circuit including transistors 20 and 21 are separated from battery 12. As a consequence, transistor 15 blocks, thus blocking the current flow through magnet 11. Lever 7 returns to its original position under the action of spring 8 and therefore, opens switch 14 which in turn interrupts the energization of motor 1. The motor thus stands still. It should further be noted that voltage peaks induced in coil 11 through the sudden termination of current therethrough are suppressed by a resistor 33 connected in series with a diode 32, the so-connected resistor and diode being connected in parallel with the coil of magnet 11. Thus any possible damage to transistors 15 and 19 is prevented.

While the invention has been illustrated and described as embodied in a specific type of control circuit and voltage stabilizing arrangement, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a movie camera having externally operable release means, in combination, magnet means for activating said camera in response to operation of said release means, said magnet means having a pull-in and a hold phase requiring, respectively, maximum and decreased energizing current; battery means having a battery output voltage; voltage stabilizing means; and control circuit means connected to said battery means and to said voltage stabilizing means for furnishing said maximum energizing current to said magnet means upon operation of said release means and for furnishing said decreased energizing current to said magnet means a predetermined time interval following operation of said release means, said control circuit means comprising first control switch means having an output circuit connected in series with said magnet means and a control electrode connected to said voltage stabilizing means, and first resistor means connected in series to said output circuit of said first control switch means, whereby said control circuit means operates substantially independently of variations in said battery output voltage.

2. A movie camera as set forth in claim 1, wherein said first control switch means comprise first transistor means, said first transistor means having an emitter-collector circuit constituting said output circuit and a base constituting said control electrode.

3. A movie camera as set forth in claim 1, further comprising compensating resistor means connected in parallel with said series connected output circuit of said first control switch means and said magnet means.

4. A movie camera as set forth in claim 1, wherein said control circuit means further comprise timing circuit means for timing said predetermined time interval; and second control switch means having a control electrode connected to said timing circuit means and an output circuit connected in parallel with the series connection of said magnet means and said output circuit of said first control switch means.

5. A movie camera as set forth in claim 4, wherein said second control switch means comprise second transistor means.

6. A movie camera as set forth in claim 4, wherein said timing circuit means comprise resistor-capacitor timing circuit means.

7. A camera as set forth in claim 1, wherein said voltage stabilizing means comprise Zener diode means, second resistor means connected in series with said Zener diode means, and means connecting said so-connected second resistor and Zener diode means in parallel with said battery means upon operation of said release means.

* * * * *